US011457621B2

(12) United States Patent
Fisher et al.

(10) Patent No.: US 11,457,621 B2
(45) Date of Patent: Oct. 4, 2022

(54) AGRICULTURAL SPRAYER SYSTEM AND METHOD

(71) Applicant: Deere & Company, Moline, IL (US)

(72) Inventors: Patrick J. Fisher, West Des Moines, IA (US); Richard A. Humpal, Ankeny, IA (US)

(73) Assignee: DEERE & COMPANY, Moline, IL (US)

( * ) Notice: Subject to any disclaimer, the term of this patent is extended or adjusted under 35 U.S.C. 154(b) by 247 days.

(21) Appl. No.: 16/510,131

(22) Filed: Jul. 12, 2019

(65) Prior Publication Data

US 2021/0007344 A1  Jan. 14, 2021

(51) Int. Cl.
B05B 12/12 (2006.01)
A01M 7/00 (2006.01)
(Continued)

(52) U.S. Cl.
CPC .......... A01M 7/0042 (2013.01); A01C 23/007 (2013.01); A01C 23/047 (2013.01);
(Continued)

(58) Field of Classification Search
CPC .............. A01M 7/0042; A01M 7/0089; A01M 7/0092; A01C 23/007; A01C 23/047; B05B 1/20; B05B 12/122; B05B 12/1472
See application file for complete search history.

(56) References Cited

U.S. PATENT DOCUMENTS

| 4,467,961 | A |   | 8/1984 | Coffee et al. |
|-----------|---|---|--------|---------------|
| 5,793,035 | A | * | 8/1998 | Beck ........................ G01J 3/501 |
|           |   |   |        | 47/1.7 |

(Continued)

FOREIGN PATENT DOCUMENTS

| DE | 102017210777 A1 | 12/2018 |
| DE | 102017220028 A1 | 5/2019 |

(Continued)

OTHER PUBLICATIONS

Koerhuis, Rene; This is Smart Spraying: Bayer & Bosch's research programme, Future Farming, published Nov. 21, 2017, https://www.futurefarming.com/Tools-data/Articles/2017/11/This-is-Smart-Spraying-Bayer-Boschs-research-programme-4120WP/.

(Continued)

Primary Examiner — Qingzhang Zhou

(57) ABSTRACT

An agricultural vehicle includes a frame, a first reservoir coupled to the frame with the first reservoir configured to hold a solvent, a second reservoir coupled to the frame with the second reservoir configured to hold a first solute, and a third reservoir coupled to the frame with the third reservoir configured to hold a second solute different than the first solute. The agricultural vehicle also includes a spray boom coupled to the frame. The spray boom includes a first spray nozzle and a second spray nozzle. The first spray nozzle is independently operable relative to the second spray nozzle such that the first spray nozzle is configured to dispense a first solution comprising the solvent and the first solute onto an agricultural surface and the second spray nozzle is configured to dispense a second solution comprising the solvent and the second solute onto the agricultural surface.

18 Claims, 3 Drawing Sheets

(51) Int. Cl.
*A01C 23/00* (2006.01)
*A01C 23/04* (2006.01)
*B05B 1/20* (2006.01)
*B05B 12/14* (2006.01)

(52) U.S. Cl.
CPC ............. *A01M 7/0089* (2013.01); *B05B 1/20* (2013.01); *B05B 12/122* (2013.01); *B05B 12/1472* (2013.01)

(56) References Cited

U.S. PATENT DOCUMENTS

| | | | |
|---|---|---|---|
| 6,079,632 | A | 6/2000 | Yan |
| 6,230,091 | B1 * | 5/2001 | McQuinn ............. A01B 79/005 |
| | | | 700/282 |
| 9,113,591 | B2 * | 8/2015 | Shivak .................... A01C 7/20 |
| 2013/0140376 | A1 | 6/2013 | Ballu |

FOREIGN PATENT DOCUMENTS

| | | |
|---|---|---|
| EP | 2658658 B1 | 9/2015 |
| WO | 2005123503 A1 | 12/2005 |

OTHER PUBLICATIONS

European Search Report issued in counterpart application No. 20183525.3 dated Dec. 10, 2020 (07 pages).

* cited by examiner

AGRICULTURAL SPRAYER SYSTEM AND METHOD

FIELD OF THE DISCLOSURE

The present disclosure relates to agricultural sprayers, and more particularly to a system and method of dispensing a solution onto an agricultural field using an agricultural sprayer.

SUMMARY

In one aspect, an agricultural vehicle is configured to dispense a solution onto an agricultural surface. The agricultural vehicle includes a frame, a first reservoir coupled to the frame with the first reservoir configured to hold a solvent, a second reservoir coupled to the frame with the second reservoir configured to hold a first solute, and a third reservoir coupled to the frame with the third reservoir configured to hold a second solute different than the first solute. The agricultural vehicle also includes a spray boom coupled to the frame. The spray boom includes a first spray nozzle and a second spray nozzle. The first spray nozzle is independently operable relative to the second spray nozzle such that the first spray nozzle is configured to dispense a first solution comprising the solvent and the first solute onto the agricultural surface and the second spray nozzle is configured to dispense a second solution comprising the solvent and the second solute onto the agricultural surface.

In another aspect, an agricultural vehicle is configured to dispense a solution onto an agricultural surface. The agricultural vehicle includes a first reservoir configured to contain a solvent, a second reservoir configured to contain a first solute, a third reservoir configured to contain a second solute different than the first solute, and a spray nozzle configured to be in communication with the first reservoir, the second reservoir, and the third reservoir. The spray nozzle includes a variable pulsing control valve. The agricultural vehicle also includes a control processor configured to send a first signal to the variable pulsing control valve to dispense a first solution of the solvent and the first solute in response to the control processor identifying a first previously defined plant matter on the agricultural surface, and send a second signal to the variable pulsing control valve to dispense a second solution of the solvent and the second solute in response to the control processor identifying a second previously defined plant matter on the agricultural surface.

In yet another aspect, a spray assembly is configured to dispense a solution onto an agricultural surface. The spray assembly includes a spray nozzle configured to be in communication with a first reservoir containing a solvent, a second reservoir containing a first solute, and a third reservoir containing a second solute. The spray nozzle includes a variable pulsing control valve. The spray assembly also includes an optic transmitter configured to capture an image including a previously defined plant matter on the agricultural surface and a control processor configured to receive the image from the optic transmitter. The control processor is also configured to send a first signal to the variable pulsing control valve to dispense a first solution of the solvent and the first solute in response to the control processor identifying a first previously defined plant matter on the agricultural surface and send a second signal to the variable pulsing control valve to dispense a second solution of the solvent and the second solute in response to the control processor identifying a second previously defined plant matter on the agricultural surface.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. Terms of degree, such as "substantially," "about," "approximately," etc. are understood by those of ordinary skill to refer to reasonable ranges outside of the given value, for example, general tolerances associated with manufacturing, assembly, and use of the described embodiments.

Figure 1:
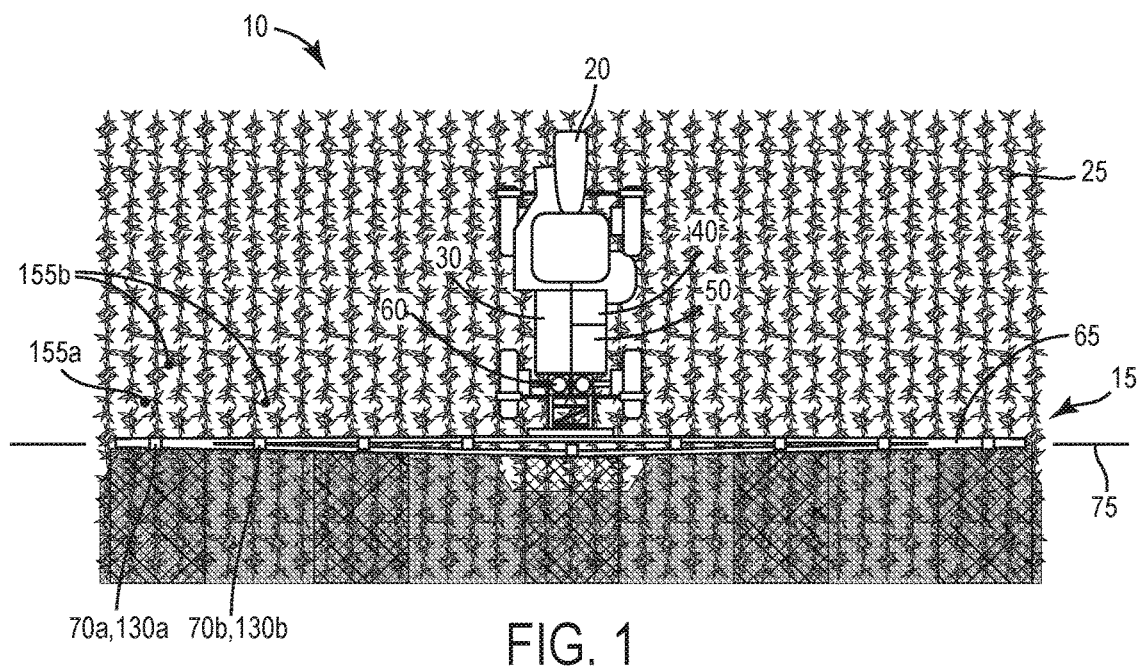
FIG. 1 is a top schematic view of an agricultural vehicle including a spray assembly.

FIG. 1 illustrates an agricultural sprayer 10 including a spray assembly 15 coupled to a vehicle (e.g., a tractor 20) moveable along an agricultural surface 25. In the illustrated embodiment, the spray assembly 15 is non-removably coupled to the tractor 20. In other embodiments, the spray assembly 15 can be removably coupled to the tractor 20.

Figure 2:
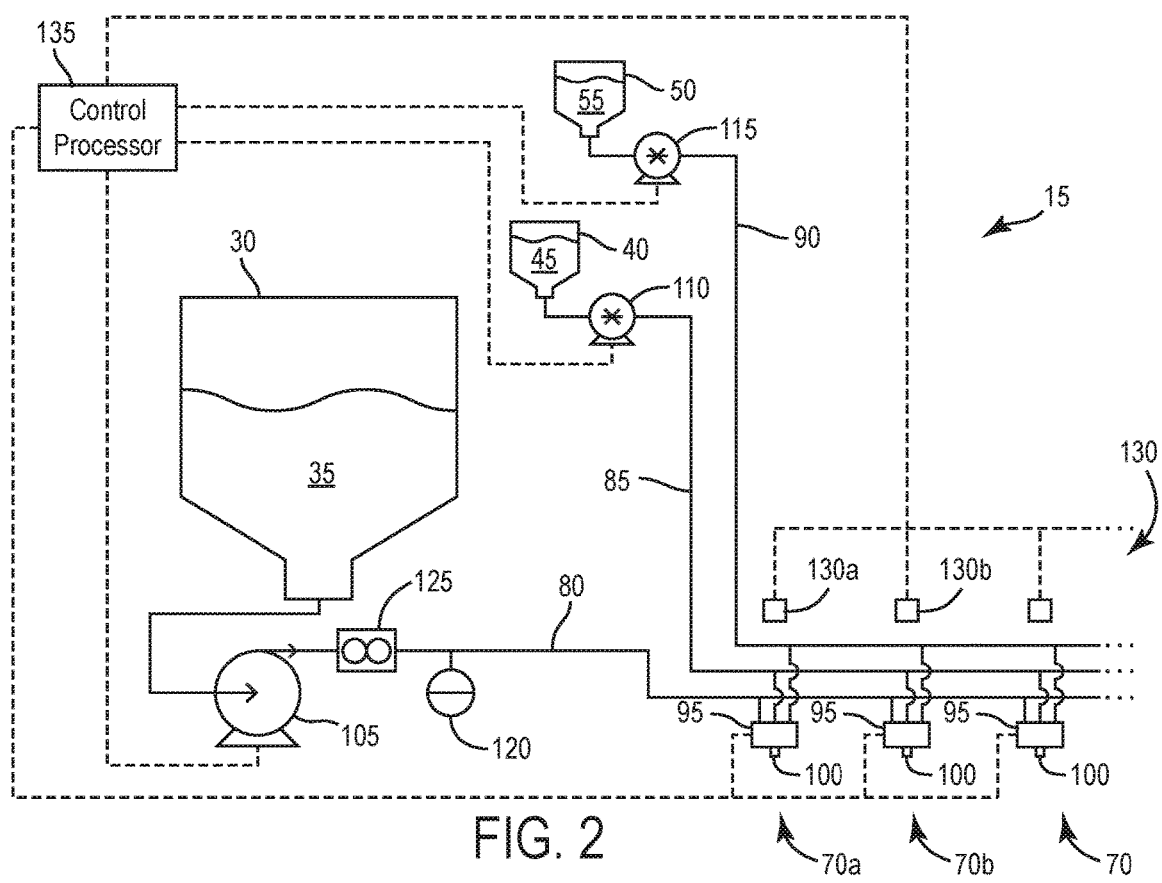
FIG. 2 is a fluid circuit diagram of a spray assembly according to one embodiment of the disclosure.

With reference to FIGS. 1 and 2, the illustrated spray assembly 15 includes a first reservoir 30 (e.g., a carrier fluid tank) configured to hold a solvent 35 (e.g., water-based liquid, water, etc.), a second reservoir 40 (e.g., a first chemical tank) configured to hold a first solute 45 (e.g., a first chemical), and a third reservoir 50 (e.g., a second chemical tank) configured to hold a second solute 55 (e.g., a second chemical). In particular, the second reservoir 40 holds a predetermined concentration of the first solute 45 (e.g., 100% concentration of a fertilizer, pesticide, herbicide, insecticide, fungicide, etc.), and the third reservoir 50 holds a predetermined concentration of the second solute 55 (e.g., 100% concentration of a fertilizer, pesticide, herbicide, insecticide, fungicide, etc.). In other embodiments, the concentration of the first and second solutes 45, 55 within the second and third reservoirs 40, 50 can be less than 100%. In the illustrated embodiment, the first solute 45 is different than the second solute 55, for example, the first solute 45 can be a first type of herbicide and the second solute 55 can be a second type of herbicide, the first solute 45 can be an insecticide and the second solute 55 can be a fungicide, etc. The illustrated first reservoir 30 includes a larger volume than the second and third reservoirs 40, 50 such that the spray assembly 15 includes more of the solvent 35 than the first and second solutes 45, 55. In some embodiments, the second reservoir 40 can include the substantially the same volume as the third reservoir 50, or the second and third reservoirs 40, 50 can include different volumes. As best shown in FIG. 1, the first, second, and third reservoirs 30, 40, 50 are coupled to a frame 60 of the tractor 20, however, in other embodiments, at least one of the first, second, and third reservoirs 30, 40, 50 can be coupled to a trailer and pulled behind the tractor 20 as the tractor 20 moves across the agricultural field 25. In further embodiments, the sprayer assembly 15 can include more than two reservoirs that each support different a solute such that the sprayer assembly 15 can include more than two solute chemicals.

The spray assembly 15 also includes a spray boom 65 coupled to the frame 60 of the tractor 20 and a plurality of spray nozzles 70 coupled to the spray boom 65 at equally spaced distances along a longitudinal axis 75 of the spray boom 65 (FIG. 1). Each nozzle 70 is in fluid communication with the first, second, and third reservoirs 30, 40, 50. As best shown in FIG. 2, the first reservoir 30 is fluidly coupled to each nozzle 70 by a first line 80, the second reservoir 40 is fluidly coupled to each nozzle 70 by a second line 85, and the third reservoir 50 is fluidly coupled to each nozzle 70 by a third line 90. However, the nozzles 70 are fluidly independent relative to each other. In other words, the first, second, and third reservoirs 30, 40, 50 are coupled to the nozzles 70 in a parallel circuit relationship (rather than a series circuit relationship). As such, the solvent 35, the first solute 45, and the second solute 55 are all isolated from each other upstream from each nozzle 70. In addition, each spray nozzle 70 includes a control valve 95 and an outlet aperture 100 (FIG. 2). The first, second, and third lines 80, 85, 90 are directly coupled to each control valve 95 with each control valve 95 being operable to mix a combination of the solvent 35, the first solute 45, and/or the second solute 55 before the mixed solution is discharged from the corresponding outlet aperture 100 onto the agricultural surface 25. The illustrated control valves 95 are also operable to reciprocate (e.g., pulse) between a closed state and an open state at a variable frequency (e.g., the control valves 95 are pulse width modulation control valves) to control the rate at which the mixed solution is discharged from the outlet apertures 100. In some embodiments, the control valves 95 can be a solenoid valve, a piezo valve, or the like.

With continued reference to FIG. 2, the spray assembly 15 further includes a first fluid pump 105 positioned along the first line 80 fluidly between the first reservoir 30 and the spray nozzles 70, a second fluid pump 110 positioned along the second line 85 fluidly between the second reservoir 40 and the spray nozzles 70, and a third fluid pump 115 positioned along the third line 90 fluidly between the third reservoir 50 and the spray nozzles 70. A pressure transducer 120 and a flow meter 125 are also positioned along the first line 80 but fluidly between the first pump 105 and the spray nozzles 70. The pressure transducer 120 is operable to measure a pressure within the first line 80, and the flow meter 125 is operable to measure a flow rate of the solvent 35 within the first line 80. In some embodiments, a pressure transducer and/or a flow meter can be positioned along the second line 85 and/or the third line 90. In one embodiment, the first, second, and third pumps 105, 110, 115 can be coupled to the frame 60 of the tractor 20, or the first, second, and third pumps 105, 110, 115 can be coupled to the spray boom 65.

As also shown in FIGS. 1 and 2, the spray assembly 15 includes a plurality of optic transmitter 130 (e.g., cameras or the like) coupled to the spray boom 65 with each optic transmitter 130 associated with one of the spray nozzles 70. Each optic transmitter 130 is configured to capture images of the agricultural surface 25 including previously defined matter. For example, the optic transmitters 130 can capture images of unwanted plant matter (e.g., weeds, etc.) on the agricultural surface 25. In other embodiments, the optic transmitters 130 can capture images of previously defined plant matter, insects, and/or fungi on the agricultural surface 25 and/or on the harvestable plant matter (e.g., corn, beans, etc.) growing on the agricultural surface 25. In other embodiments, each optic transmitter 130 can be associated with a plurality of spray nozzles 70. In further embodiments, the optic transmitters 130 can be sensors that detect previously defined plant matter/insects/fungi.

Figure 3:
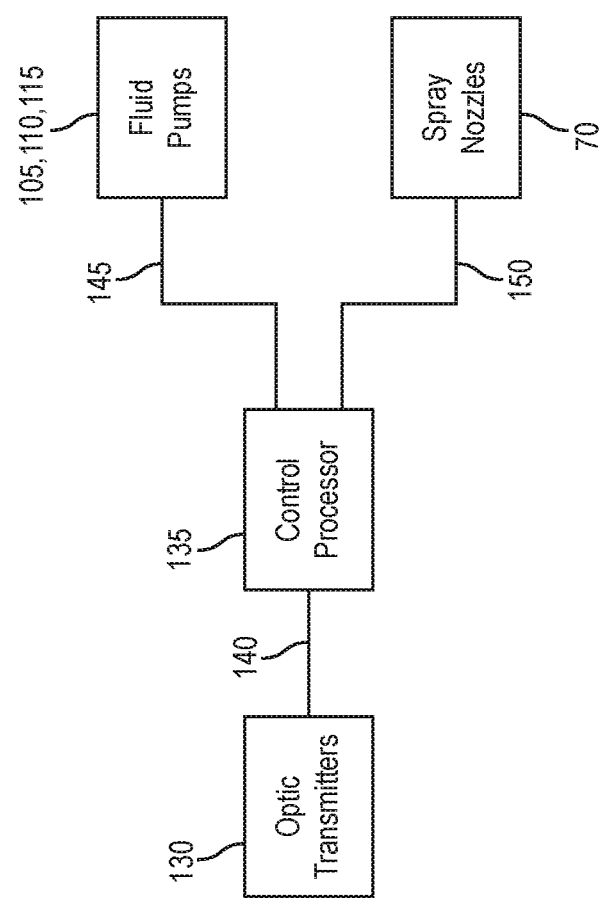
FIG. 3 is a control diagram including a control processor operable to control the spray assembly of FIG. 2.

With reference to FIGS. 2 and 3, a control processor 135 is in communication with the optic transmitters 130, the pumps 105, 110, 115, and the spray nozzles 70. In some embodiments, the control processor 135 can be coupled to the tractor 20 or the spray boom 65. The illustrated control processor 135 receives a first signal 140 (e.g., an image) from each optic transmitter 130, and based on the first signal 140, the control processor 135 sends a second signal 145 to at least one pump 105, 110, 115 and/or sends a third signal 150 to at least one spray nozzle 70. Furthermore, the control processor 135 is in communication with the pressure transducer 120 and the flow meter 125 to receive the pressure and/or flow rate within the first line 80.

In operation, each optic transmitter 130 is operable to capture images of unwanted plant matter/insects/fungi as the agricultural sprayer 10 moves across the agricultural surface 25. Based on the particular plant matter/insects/fungi captured by the optic transmitters 130, the control processor 135 determines the appropriate mixed solution of the solvent 35, first solute 45, and/or second solute 55 to be dispensed from the spray assembly 15 and applied to the specific unwanted plant matter/insects/fungi. All of the optic transmitters 130 and the spray nozzles 70 operate in a similar manner, therefore, only one optic transmitter 130 and one spray nozzle 70 will be discussed in detail below but is applicable to the other optic transmitters 130 and spray nozzles 70. As the spray assembly 15 moves along the agricultural surface 25, a first optic transmitter 130a (FIG. 1) can capture an image of a first type of unwanted plant matter/insects/fungi 155a located generally in front of a first spray nozzle 70a. The first optic transmitter 130a then sends the first signal 140 (e.g., an image) to the control processor 135 for the control processor 135 to analyze. Once the control processor 135 identifies, for example, the first type of unwanted plant matter/insects/fungi 155a, the control processor 135 sends the second and third signals 145, 150 to control the pumps 105, 110, 115 and the first spray nozzle 70a. In one embodiment, the control processor 135 could determine that a mixed solution of the solvent 35 and the first solute 45 would be best to treat the first type of unwanted plant matter/insects/fungi 155a (e.g., than a mixed solution of the solvent 35 and the second solute 55). Accordingly, the control processor 135 sends the second signal 145 to actuate the first and second pumps 105, 110 to pressurize the solvent 35 and the first solute 45 within their respective first and second lines 80, 85. In addition, the control processor 135 sends the third signal 150 to the first spray nozzle 70a such that the first spray nozzle 70a blocks fluid communication between the third line 90 and the outlet aperture 100 and allows fluid communication between the first and second lines 80, 85 and the outlet aperture 100. As a result, the solvent 35 and the first solute 45 are mixed together within the control valve 95 of the first spray nozzle 70a.

To dispense the mixed solution of the solvent 35 and the first solute 45 from the first spray nozzle 70a, the control valve 95 opens and closes (e.g., pulses) at a desired frequency to dispense the mixed solution from the outlet aperture 100 at a desired flow rate. Specifically, the frequency of the pulses of the control valve 95 are dependent upon a velocity of the agricultural sprayer 10 moving across the agricultural surface 25. In general, the control processor 135 increases the frequency of the pulses of the control valve 95 as the velocity of the agricultural sprayer 10 increases, and the control processor 135 decreases the frequency of the pulses of the control valve 95 as the velocity of the agricultural sprayer 10 decreases. As such, the control processor 135 regulates an amount (e.g., flow rate) of the mixed solution from the first spray nozzle 70a dependent upon the velocity of the agricultural sprayer 10 to increase the efficiency of the mixed solution being dispensed onto the agricultural surface 25.

Furthermore, the control processor 135 can regulate a concentration of the mixed solution of the solvent 35 and the first solute 45 being dispensed from the first spray nozzle 70a. The control processor 135 can determine a quantity of the first type of unwanted plant matter/insects/fungi 155a based on the first signal 140 and can change the concentration of the mixed solution accordingly. For example, if the control processor 135 determines a high quantity of the first type of unwanted plant matter 155a, the concentration of the mixed solution will increase (e.g., 70% solvent 35 to 30% first solute 45, etc.), but if the control processor 135 determines a low quantity of the first type of unwanted plant matter 155a, the concentration of the mixed solution will decrease (e.g., 90% solvent 35 to 10% first solute 45, etc.). In some embodiments, the control processor 135 can change the concentration of the mixed solution by regulating a flow rate of the solvent 35 and/or the first solute 45 into the control valve 95. For example, the control valve 95 can reduce fluid communication with the first line 80 and/or the second line 85 (e.g., the control valve 95 can partially close the first line 80 and/or the second line 85) to change the flow rate of the solvent 35 and/or the first solute 45 entering the control valve 95. In other embodiments, the control processor 135 can change the concentration of the mixed solution by regulating a pressure within the first line 80 and/or the second line 85 via the first pump 105 and/or the second pump 110 to change the flow rate of the solvent 35 and/or the first solute 45 entering the control valve 95.

As the first, second, and third lines 80, 85, 90 are coupled directly to the first spray nozzle 70a, the agricultural sprayer 10 can quickly adapt and react to different unwanted plant matter/insects/fungi when the agricultural sprayer 10 moves across the agricultural surface 25. For example, shortly after detecting the first type of unwanted plant matter/insects/fungi 155a, the control processor 135 can detect a second type of unwanted plant matter/insects/fungi 155b (FIG. 1) different than the first type of unwanted plant matter/insects/fungi 155a. In the illustrated embodiment, the second type of unwanted plant matter/insects/fungi 155b is best treated with a mixed solution of the solvent 35 and the second solute 55. Accordingly, the control processor 135 sends the second signal 145 to actuate the first and third pumps 105, 115 to pressurize the solvent 35 and the second solute 55 within their respective first and third lines 80, 90, and the control processor 135 sends the third signal 150 to the first spray nozzle 70a such that the first spray nozzle 70a blocks fluid communication between the second line 85 and the outlet aperture 100 and allows fluid communication between the first and third lines 80, 90 and the outlet aperture 100. The mixed solution of the solvent 35 and the second solute 55 is then dispensed from the outlet aperture 100 at a frequency dependent upon the velocity of the agricultural sprayer 10. Accordingly, the agricultural sprayer 10 can localize specific mixed solutions dispensed from the first spray nozzle 70*a* to target particular unwanted plant matter/insects/fungi 155*a*, 155*b* on the agricultural surface 25 to increase the efficiency of the solvent 35, the first solute 45, and the second solute 55 being used.

In some embodiments, the control processor 135 can continuously actuate the pumps 105, 110, 115 to continuously pressurize the lines 80, 85, 90 at a set pressure such that the first spray nozzle 70*a* can regulate which solute 45, 55 is mixed with the solvent 35 and the frequency of the mixed solution being dispensed from the outlet aperture 100. For example, the control processor 135 continuously actuates the pumps 105, 110, 115 to hold a substantially constant pressure within each line 80, 85, 90. In other embodiments, the control processor 135 can still continuously actuate the pumps 105, 110, 115 during operation, but can reduce the pressure within the lines 80, 85, 90 if not being used (e.g., if the first spray nozzle 70*a* is dispensing the mixed solution of the solvent 35 and the first solute 45, the control processor 135 can reduce the pressure within the third line 90 carrying the second solute 55). When the mixed solution of the solvent 35 and the second solute 55 is then desired, the control processor 135 can increase the pressure within the third line 90 and reduce the pressure within the second line 85 carrying the first solute 45. For example, the control processor 135 can independently change a pressure level within each line 80, 85, 90. In further embodiments, the control processor 135 can deactivate individual pumps 105, 110, 115 when the corresponding solvent 35, first solute 45, or second solute 55 is not being used.

In the illustrated embodiment, the control processor 135 can independently operate each spray nozzle 70 such that different spray nozzles 70 can treat different unwanted plant matter/insects/fungi at generally the same time. With continued reference to FIG. 1, the second type of unwanted plant matter 155*b* can be positioned generally in front of a second spray nozzle 70*b* adjacent the first spray nozzle 70*a* at substantially the same distance (in a direction transverse to the longitudinal axis 75) as the first type of unwanted plant matter 155*a* generally in front of the first spray nozzle 70*a*. As a result, the control processor 135 controls the first spray nozzle 70*a* to dispense the mixed solution of the solvent 35 and the first solute 45 to treat the first type of unwanted plant matter 155*a* (as discussed above), and the control processor 135 also controls the second spray nozzle 70*b* to dispense the mixed solution of the solvent 35 and the second solute 55 to treat the second type of unwanted plant matter 155*b* at substantially the same time. In particular, the control processor 135 sends the third signal 150 to the second spray nozzle 70*b* such that the second spray nozzle 70*b* blocks fluid communication between the second line 85 and the outlet aperture 100 and allows fluid communication between the first and third lines 80, 90 and the outlet aperture 100. Accordingly, each spray nozzle 70 is independently operable from the other spray nozzles 70 to dispense a specific solution, concentration of the solution, flow rate of the solution, etc. to best treat the specific unwanted plant matter/insects/fungi captured by each optic transmitter 130 (FIG. 1).

The illustrated sprayer assembly 15 also provides an easy method of cleaning each reservoir 30, 40, 50 and the corresponding line 80, 85, 90 such that a different solvent 35/solute 45, 55 can be used to treat various unwanted plant matter/insects/fungi on the agricultural surface 25. For example, the second solute 55 can be easily replaced with a third solute by flushing out the second solute 55 from the third reservoir 50 and third line 90 (e.g., with water, cleaning solution, etc.) and the third solute can be poured into the third reservoir 50. The third pump 115 can then prime the third line 90 with the third solute. As such, the solvent 35 and the first solute 45 are unaffected by replacing the second solute 55 with the third solute. Operation of replacing the solvent 35 and the first solute 45 are carried out in a similar manner.

Figure 4:
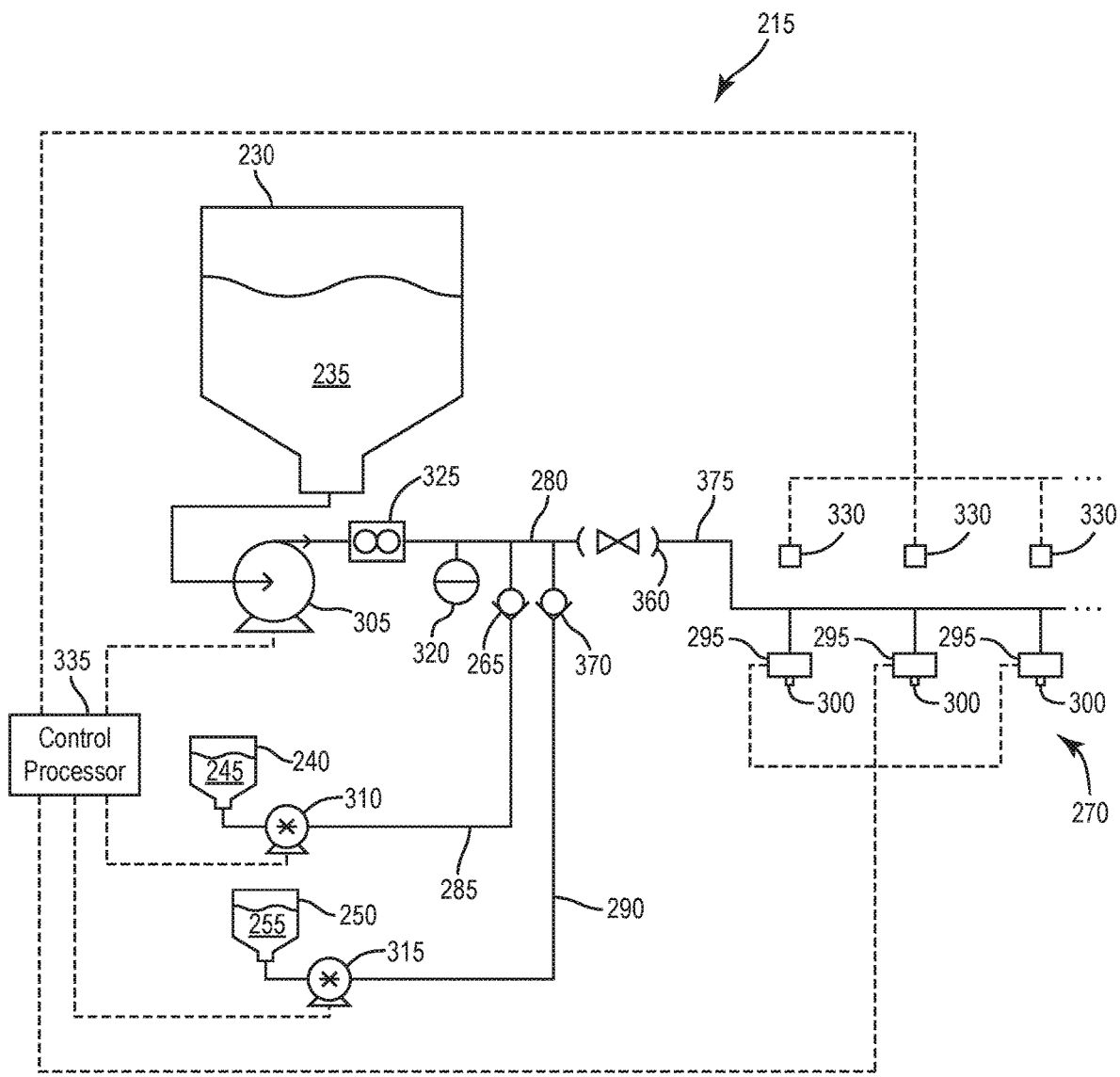
FIG. 4 is a fluid circuit diagram of a spray assembly according to another embodiment of the disclosure.

FIG. 4 illustrates a spray assembly 215 according to another embodiment. The spray assembly 15 is similar to the spray assembly 215; therefore, similar components are designated with similar references numbers plus 200. At least some differences and/or at least some similarities between the spray assemblies 15, 215 will be discussed in detail below. In addition, components or features described with respect to the spray assembly 215 are equally applicable to the spray assembly 15.

The illustrated spray assembly 215 includes a first reservoir 230 configured to hold a solvent 235, a second reservoir 240 configured to hold a first solute 245, and a third reservoir 250 configured to hold a second solute 255. The spray assembly 215 also includes a plurality of spray nozzles 270 positioned downstream of a mixing valve 360. The first reservoir 230 is fluidly coupled to the mixing valve 360 by a first line 280, the second reservoir 240 is fluidly coupled to the mixing valve 360 by a second line 285, and the third reservoir 250 is fluidly coupled to the mixing valve 360 by a third line 290. In addition, a pressure transducer 320 and a flow meter 325 are positioned along the first line 280, a first check valve 365 is positioned along the second line 285, and a second check valve 370 is positioned along the third line 290. A first fluid pump 305 is operable to push the solvent 235 to the mixing valve 360, a second fluid pump 310 is operable to push the first solute 245 to the mixing valve 360, and a third fluid pump 315 is operable to push the second solute 255 to the mixing valve 360. As such, the mixing valve 360 is operable to mix the solvent 235 and the first solute 245/second solute 255 before the mixed solution travels through a fourth line 375 to the spray nozzles 270. As such, the spray assembly 215 includes one line 375 extending along a spray boom (similar to the spray boom 65) such that each nozzle 270 is coupled to the other nozzles 270 in a series circuit relationship. Each spray nozzle 270 includes a control valve 295 and an outlet aperture 300 with the fourth line 375 directly coupled to the control valves 295. The spray assembly 215 also includes a plurality of optic transmitters 330 and a control processor 335 in communication with the optic transmitters 330, the pumps 305, 310, 315, and the spray nozzles 270.

When a mixed solution of the solvent 235 and the first solute 245 is desired, the control processor 335 actuates the first and second pumps 305, 310 to push the solvent 235 and the first solute 245 toward the mixing valve 360. Neither the solvent 235 nor the first solute 245 can enter the third line 290 due to the second check valve 370 blocking flow into the third line 290. The solvent 235 and the first solute 245 are mixed together when traveling through the mixing valve 360 (rather than being mixed by the spray nozzles as discussed in the previous embodiment illustrated in FIGS. 1-3). The concentration of the mixed solution can change dependent upon the amount of the first solute 245 introduced into the first line 280 (e.g., the second pump 310 pressurizes the second line 285 at different amounts to change the flow rate of the first solute 245 entering the first line 280). In some embodiments, the first pump 305 provides the primary pressure within the fourth line 375 to move the mixed solution to the spray nozzles 270. In other embodiments, the first pump 305 and the second pump 310 collectively produce the pressure within the fourth line 375 to move the mixed solution to the spray nozzles 270.

When a mixed solution of the solvent 235 and the second solute 255 is desired, the control processor 335 actuates the first and third pumps 305, 315 to push the solvent 235 and the second solute 255 toward the mixing valve 360. Neither the solvent 235 nor the second solute 255 can enter the second line 285 due to the first check valve 365 blocking flow into the second line 285. The solvent 235 and the second solute 255 are mixed together when traveling through the mixing valve 360. The concentration of the mixed solution can change dependent upon the amount of the second solute 255 introduced into the first line 280 (e.g., the third pump 315 pressurizes the third line 290 at different amounts to change the flow rate of the second solute 255 entering the first line 280). In some embodiments, the first pump 305 provides the primary pressure within the fourth line 375 to move the mixed solution to the spray nozzles 270. In other embodiments, the first pump 305 and the third pump 315 collectively produce the pressure within the fourth line 375 to move the mixed solution to the spray nozzles 270.

Although the disclosure has been described in detail with reference to certain preferred embodiments, variations and modifications exist within the scope and spirit of one or more independent aspects of the disclosure as described. Various features and advantages of the disclosure are set forth in the following claims.

The invention claimed is:

1. An agricultural vehicle configured to dispense a solution onto an agricultural surface, the agricultural vehicle comprising:
   a frame;
   a first reservoir coupled to the frame, the first reservoir configured to hold a solvent;
   a second reservoir coupled to the frame, the second reservoir configured to hold a first solute;
   a third reservoir coupled to the frame, the third reservoir configured to hold a second solute different than the first solute;
   a spray boom coupled to the frame, the spray boom including a first spray nozzle and a second spray nozzle, wherein the first spray nozzle is independently operable relative to the second spray nozzle and wherein the first and second spray nozzles include a variable pulsing control valve;
   an optic transmitter coupled to the spray boom and configured to capture an image including a previously defined plant matter on the agricultural surface; and
   a control processor in communication with the optic transmitter and configured such that in operation (i) a first solution including the solvent and the first solute is dispensed from the first spray nozzle in response to the control processor identifying a first previously defined plant matter on the agricultural surface and (ii) a second solution including the solvent and the second solute is dispensed from the second spray nozzle in response to the control processor identifying a second previously defined plant matter on the agricultural surface.

2. The agricultural vehicle of claim 1, wherein the first spray nozzle is configured to dispense the first solution onto the agricultural surface at the same time the second solution is being dispensed from the second spray nozzle onto the agricultural surface.

3. The agricultural vehicle of claim 1, further comprising a first line communicating with the first reservoir, the first spray nozzle, and the second spray nozzle, a second line communicating with the second reservoir, the first spray nozzle, and the second spray nozzle, and a third line communicating with the third reservoir, the first spray nozzle, and the second spray nozzle, wherein the first, second, and third lines are coupled to the first and second spray nozzles in a parallel relationship.

4. The agricultural vehicle of claim 1, wherein the variable pulsing control valve of the first spray nozzle is configured to control a flow rate of the first solution during operation of dispensing the first solution onto the agricultural surface, and wherein the variable pulsing control valve of the second spray nozzle is configured to control a flow rate of the second solution during operation of dispensing the second solution onto the agricultural surface.

5. The agricultural vehicle of claim 4, wherein the flow rates of the first and second solutions are dependent upon a speed of the agricultural vehicle over the agricultural surface.

6. The agricultural vehicle of claim 1, further comprising a first pump coupled to the frame and configured to transfer the solvent from the first reservoir to the first spray nozzle and the second spray nozzle, a second pump coupled to the frame and configured to transfer the first solute from the second reservoir to the first spray nozzle and the second spray nozzle, and a third pump coupled to the frame and configured to transfer the second solute from the third reservoir to the first spray nozzle and the second spray nozzle.

7. An agricultural vehicle configured to dispense a solution onto an agricultural surface, the agricultural vehicle comprising:
  a frame;
  a first reservoir coupled to the frame, the first reservoir configured to contain a solvent;
  a second reservoir coupled to the frame, the second reservoir configured to contain a first solute;
  a third reservoir coupled to the frame, the third reservoir configured to contain a second solute different than the first solute;
  a spray boom coupled to the frame, the spray boom including a spray nozzle configured to be in fluid communication with the first reservoir, the second reservoir, and the third reservoir, the spray nozzle including a variable pulsing control valve;
  an optic transmitter configured to capture an image including a previously defined plant matter on the agricultural surface and
  a control processor configured to:
    receive the image from the optic transmitter,
    send a first signal to the variable pulsing control valve to dispense a first solution of the solvent and the first solute in response to the control processor identifying a first previously defined plant matter on the agricultural surface, and
    send a second signal to the variable pulsing control valve to dispense a second solution of the solvent and the second solute in response to the control processor identifying a second previously defined plant matter on the agricultural surface.

8. The agricultural vehicle of claim 7, wherein the spray nozzle is a first spray nozzle, and wherein the agricultural vehicle includes a second spray nozzle configured to be in fluid communication with the first reservoir, the second reservoir, and the third reservoir, and wherein the control processor is configured to send a third signal to a variable pulsing control valve of the second spray nozzle to dispense the second solution on the agricultural surface at the same time the first solution is being dispensed from the first spray nozzle onto the agricultural surface.

9. The agricultural vehicle of claim 8, further comprising a first line communicating with the first reservoir, the first spray nozzle, and the second spray nozzle, a second line communicating with the second reservoir, the first spray nozzle, and the second spray nozzle, and a third line communicating with the third reservoir, the first spray nozzle, and the second spray nozzle, and wherein the first, second, and third lines are coupled to the first and second spray nozzles in a parallel relationship.

10. The agricultural vehicle of claim 7, wherein the variable pulsing control valve is configured to change a flow rate of the first and second solutions being dispensed on the agricultural surface dependent upon a speed of the agricultural vehicle over the agricultural surface.

11. The agricultural vehicle of claim 7, further comprising a first pump configured to transfer the solvent from the first reservoir to the spray nozzle, a second pump configured to transfer the first solute from the second reservoir to the spray nozzle, and a third pump configured to transfer the second solute from the third reservoir to the spray nozzle.

12. The agricultural vehicle of claim 7, further comprising a mixing valve configured to mix the solvent and the first solute into the first solution upstream from the spray nozzle and configured to mix the solvent and the second solute into the second solution upstream from the spray nozzle, and wherein the first and second solutions are configured to travel through a line fluidly coupling the mixing valve and the spray nozzle for the first and second solutions to be dispensed from the spray nozzle.

13. A spray assembly configured to dispense a solution onto an agricultural surface, the spray assembly comprising:
  a spray nozzle configured to be in fluid communication with a first reservoir containing a solvent, a second reservoir containing a first solute, and a third reservoir containing a second solute, the spray nozzle including a variable pulsing control valve;
  an optic transmitter configured to capture an image including a previously defined plant matter on the agricultural surface; and
  a control processor configured to:
    receive the image from the optic transmitter,
    send a first signal to the variable pulsing control valve to dispense a first solution of the solvent and the first solute in response to the control processor identifying a first previously defined plant matter on the agricultural surface, and
    send a second signal to the variable pulsing control valve to dispense a second solution of the solvent and the second solute in response to the control processor identifying a second previously defined plant matter on the agricultural surface.

14. The spray assembly of claim 13, wherein the spray nozzle is a first spray nozzle, and wherein the spray assembly includes a second spray nozzle configured to be in fluid communication with the first reservoir, the second reservoir, and the third reservoir, and wherein the control processor is configured to send a third signal to a variable pulsing control valve of the second spray nozzle to dispense the second solution on the agricultural surface at the same time the first spray nozzle is dispensing the first solution on the agricultural surface.

15. The spray assembly of claim 14, further comprising a first line communicating with the first reservoir, the first spray nozzle, and the second spray nozzle, a second line communicating with the second reservoir, the first spray nozzle, and the second spray nozzle, and a third line communicating with the third reservoir, the first spray nozzle, and the second spray nozzle, and wherein the first, second, and third lines are coupled to the first and second spray nozzles in a parallel relationship.

16. The spray assembly of claim 13, wherein the variable pulsing control valve is configured to change a flow rate of the first and second solutions being dispensed on the agricultural surface dependent upon a speed of the agricultural vehicle over the agricultural surface.

17. The spray assembly of claim 13, further comprising a first pump configured to transfer the solvent from the first reservoir to the spray nozzle, a second pump configured to transfer the first solute from the second reservoir to the spray nozzle, and a third pump configured to transfer the second solute from the third reservoir to the spray nozzle.

18. The spray assembly of claim 13, further comprising a mixing valve configured to mix the solvent and the first solute into the first solution upstream from the spray nozzle and configured to mix the solvent and the second solute into the second solution upstream from the spray nozzle, and wherein the first and second solutions are configured to travel through a line fluidly coupling the mixing valve and the spray nozzle for the first and second solutions to be dispensed from the spray nozzle.

* * * * *